Figure 1:
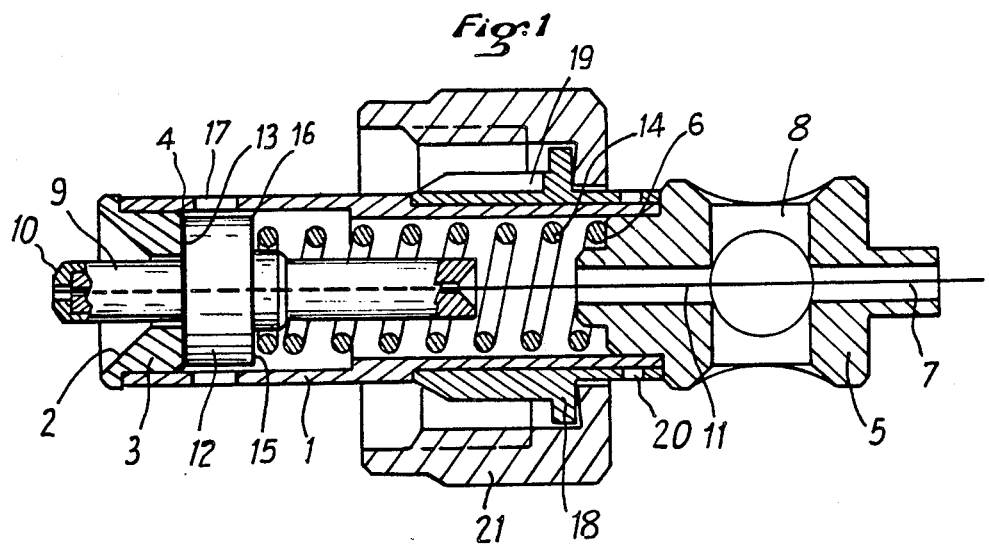

United States Patent [19]

Yin et al.

[11] Patent Number: 4,792,205
[45] Date of Patent: Dec. 20, 1988

[54] FERRULE OF A CONNECTOR FOR SINGLE-MODE OPTICAL FIBERS WITH POLARIZATION MAINTENANCE AND THE PROCESS FOR ITS ADJUSTMENT

[75] Inventors: Huan B. Yin, Paris; Norbert Valade, Le Blanc Mesnil, both of France

[73] Assignee: Radiall Industrie, Rosny-Sous-Bois, France

[21] Appl. No.: 50,497

[22] Filed: May 13, 1987

[30] Foreign Application Priority Data

May 15, 1986 [FR] France ............................... 86 06993

[51] Int. Cl.⁴ ............................................. G02B 6/36
[52] U.S. Cl. ................................................. 350/96.20
[58] Field of Search ................ 350/96.20, 96.21, 96.22

[56] References Cited

U.S. PATENT DOCUMENTS

| | | | |
|---|---|---|---|
| 3,936,143 | 2/1976 | Sato | 350/96.21 |
| 3,954,338 | 5/1976 | Hennel et al. | 350/96.21 X |
| 3,982,815 | 9/1976 | Nakayama | 350/96.22 |
| 4,181,402 | 1/1980 | Borsuk et al. | 350/96.21 |
| 4,378,145 | 3/1983 | Stancati et al. | 350/96.21 |
| 4,389,091 | 6/1983 | Lidholt et al. | 350/96.20 |
| 4,411,491 | 10/1983 | Larkin et al. | 350/96.21 |
| 4,673,244 | 6/1987 | Miles | 350/96.2 |
| 4,696,538 | 9/1987 | Despouys | 350/96.20 |
| 4,705,352 | 11/1987 | Margolin et al. | 350/96.2 |
| 4,738,507 | 4/1988 | Palmquist | 350/96.21 |
| 4,738,508 | 4/1988 | Palmquist | 350/96.21 |

FOREIGN PATENT DOCUMENTS

| | | |
|---|---|---|
| 0063085 | 10/1982 | European Pat. Off. |
| 131488 | 1/1985 | European Pat. Off. |
| 165837 | 12/1985 | European Pat. Off. |
| 2742357 | 4/1979 | Fed. Rep. of Germany ... 350/96.21 |
| 3042609 | 6/1982 | Fed. Rep. of Germany. |
| 2553525 | 4/1985 | France. |
| 59-176714 | 10/1984 | Japan. |
| 2058392 | 4/1981 | United Kingdom. |
| 2147430A | 5/1985 | United Kingdom ............... 350/96.2 |

OTHER PUBLICATIONS

Susaki et al., "Splicing of Single-Polarization fibres by an Optical Short-Pulse Method", *Electronics Letters*, vol. 18, No. 23, Nov. 1982, pp. 997-999.

Kato, "Fusion Splicing of Polarization Preserving Fibers", *Applied Optics*, Aug. 1985, vol. 24, No. 15, pp. 2346-2350.

Review of Electrical comm. Laboratories, 418, vol. 27 (1979) Nov./Dec., No. 11-12; "Demountable Connectors for Optical Fiber Transmission Equipment," Suzuki et al.

*Primary Examiner*—John D. Lee
*Attorney, Agent, or Firm*—Arnold, White & Durkee

[57] ABSTRACT

A ferrule of a connector for single-mode optical fibers with polarization maintenance is provided and comprises a tubular outer body which has at its front end a wall that is conical in profile, an inner cylindrical elements inside which an optical fiber can be immobilized, particularly by gluing, said inner element protruding from said end of the outer body, said outer body comprising radial holes for the insertion of devices such as piercers for mechanically centering the inner element in the outer body. The connector includes a socket (18) attached in rotation around said body (1) and means (2) for immobilizing said socket, preferably by gluing, on said body, said socket being, moreover, equipped with an indexing reference (19).

3 Claims, 1 Drawing Sheet

U.S. Patent  Dec. 20, 1988  4,792,205

FERRULE OF A CONNECTOR FOR SINGLE-MODE OPTICAL FIBERS WITH POLARIZATION MAINTENANCE AND THE PROCESS FOR ITS ADJUSTMENT

BACKGROUND OF THE INVENTION

The present invention relates to a ferrule of a connector for single-mode optical fibers with polarization maintenance: that is, optical fibers comprising an elliptical core inside a circular section optical shaft. If necessary, both sides of the elliptical core have constraint elements that exercise an internal asymmetrical constraint on the core or an additional circular core surrounded by an elliptical constraint element.

Such fibers are currently used, for example, in the fabrication of sensors, such as those in high-sensitivity interferometers that require a stable state of linear polarization.

Such fibers are also intended for use in telecommunications systems at very high transmission band.

In connecting these complex fibers, the principal axes of the elliptical core or the elliptical constraint element surrounding the circular core must be aligned in order to decrease connection losses and, above all, to avoid disturbing the polarization state.

The filing company has already described, in EP-A- No. 0063085, a connector for optical fibers that comprises two male ferrules attached to the end of each of the connected fibers, and a female access coupler pierced lengthwise to support and align the two ferrules face to face.

In the central part of the female coupler, inside its lengthwise pierced hole, is a thrust bearing body for the male ferrules. The thrust bearing body has a transverse axial orifice and, around this, a contact projection opposite each of the male ferrules. Each male ferrule has an axial tubular protuberance that can be inserted into the orifice of the thrust bearing body and a conduit into which the optical fiber can be introduced loosely and immobilized in such a way that its end coincides with the end of the protuberance. Each of the ferrules, moreover, has an annular groove set back from the protuberance and surrounding the back part of the latter. The wall of the groove defines a projection of contact with the projection opposite the thrust bearing body of the female coupler under the action of longitudinal means of pressure. The projections opposite the thrust bearing body and each of the male ferrules are arranged in such a way that during any relative movement of the projections in contact, the end of a fiber at the level of the end of the protuberance of a male ferrule will remain at a predetermined, constant distance from the center of the thrust bearing body. The thrust bearing device is preferably a sphere, and the annular groove of each male ferrule has a wall that is conical in profile.

The present invention proposes to produce a male ferrule for a connector of this type, having the general characteristics of the aforementioned ferrules and suitable for cooperating with an access coupler of the type described above to more specifically connect single-mode optical fibers with polarization maintenance.

For this purpose the ferrule produced according to the present invention comprises a tubular outer body, the front end of which has a groove with a wall that is conical in profile. The outer body contains an inner cylindrical element, inside which an optical fiber can be immobilized, particularly by gluing. The inner element protrudes from the end of the outer body, which has radial holes for inserting devices such as piercers for mechanically centering the inner element inside the outer body. The ferrule is characterized by a socket attached in rotation around the body and by means for immobilizing said socket, preferably by gluing, on said body. In addition, the socket is equipped with an indexing reference.

Preferably, the indexing reference consists of a groove through which the ferrule can be inserted onto a corresponding peg in the female access coupler of the connector by placing the ferrule in the access coupler while maintaining the angular position of the fixed fiber, as will be explained later.

To immobilize the inner element containing the optical fiber in the outer body of the ferrule, the ferrule produced according to the invention should have the characteristics described in EP-A- No. 0165837. Thus, the inner groove of the outer body may have, in the area of the radial holes for inserting the piercers, a flat projection perpendicular to its longitudinal axis and a rigid nucleus positioned and immobilized around the inner element. The nucleus comprises a flat projection perpendicular to the longitudinal axis of the element and peripheral projection arranged opposite the radial holes of the outer body. An elastic axial support is exercised on the nucleus, causing the flat projections of the outer body and those of the joined nucleus of the inner element to press in mutual contact.

The elastic support should be carried out via a helical compression spring supported on one end by a projection of the nucleus, parallel and axially opposite said flat projection, and on the other end, by a wall constituting the back of the groove of the outer body. According to the invention, said back wall is formed on an obturation piece of the back of the body inserted into the body and equipped with a longitudinal conduit for passing the fiber and with at least one radial hole, whose use will be explained below. The hole(s) should be suitable for filling with a resin.

In order to center the fiber in the ferrule, as described in EP-A- No. 0063085 and EP-A- No. 0165837, the fiber is illuminated with a white light through the hole in the obturation piece inserted into the back of the body, while the ferrule is held opposite a telescope equipped with a crossbar-shaped reticule.

Thus, by using piercers inserted into the radial holes of the body, the center of the elliptical fiber core or the circular fiber core surrounded by the elliptical constraint element is brought to coincide with the center of the crossbar of the telescope opposite which the ferrule has been placed. Then, according to the present invention, the fiber core is angularly oriented by relative rotation of the crossbar surrounding the body. The large axis of the elliptical core or the elliptical constraint element surrounding the circular fiber core is thus brought to coincide with the desired horizontal or vertical axis of the crossbar, after which the socket on the outer body of the ferrule is immobilized by gluing with resin injected into the radial orifice(s) provided for that purpose. The resulting angular position of the fiber in the body of the ferrule is effected by the indexing groove, which now can be inserted onto the corresponding peg of the access coupler, when the ferrule is inserted into the access coupler. The resulting polarization of the fiber effected for both ferrules of a single connector will be maintained in the connection.

Figure 2A:
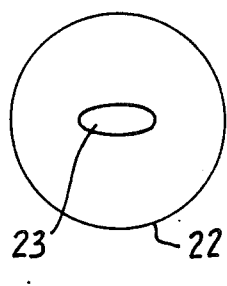
Figure 2B:
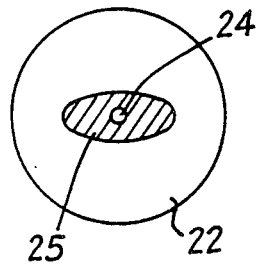
Figure 2C:
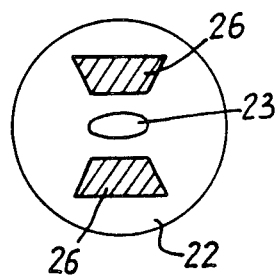
Figure 3:
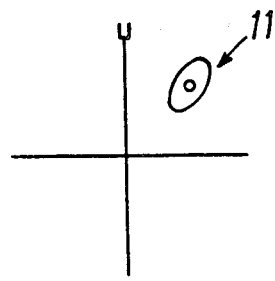
Figure 4:
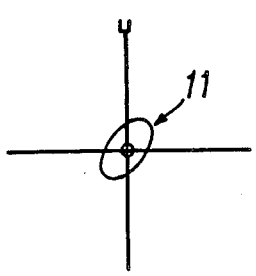
Figure 5:
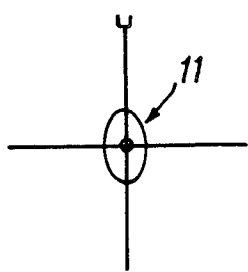

In the interest of better explaining the invention, we will now describe an application by way of an example that in now way limits the invention and that refers to the attached figures, of which:

FIG. 1 is an internal view of a ferrule produced according to the invention;

FIGS. 2a, 2b, and 2c are internal schematic views of three examples of single-mode optical fibers with polarization maintenance that can be used with the ferrule of FIG. 1; and FIGS. 3 through 5 illustrate the image observed through the telescope in the course of three successive stages of adjustment.

The ferrule prepared according to the invention comprises a tubular outer body (1), whose front end has a conically shaped cavity wall (2). This wall (2) is formed on a piece (3) fixed in the body and comprising a flat projection (4) perpendicular to the longitudinal axis of the body (1).

The back end of the body (1) is blocked by an obturation piece((5) equipped with a frontal projection (6), an axial conduit (7) for the passage of an optical fiber and at least one radial hole (8). A metallic tubular cylindrical element (9) is placed inside the body, with the front end (10) of the element protruding from the wall (2).

A single-mode optical fiber with polarization maintenance (11) is placed in an axial conduit provided in the element (9) for this purpose. The fiber (11) is immobilized in the inner element (9), preferably by gluing the end.

Beforehand, one has positioned and joined around the element (9) a rigid nucleus (12) with a frontal projection (13) that can be forcefully pressed plane over plane against the projection (4) of the piece (3 by a helical spring (14) compressed between the back projection (15) of the nucleus (12) and the projection (6) of the back obturation piece (5). In the illustrated blockage position a peripheral projection (16) of the nucleus is found opposite (preferably) four equiangularly distributed radial holes (17) that traverse the wall of the body (1).

According to the invention, around the body (1) against its back part, is an attached free socket (18) in rotation around the body provided with an indexing groove (19). The socket (18) also comprises a number of radial orifices (20) for injection of a resin to immobilize the socket (18) by gluing on the body (2) in a definite angular position.

Finally, a sleeve (21) is provided which joins the ferrule on a female access coupler, as described in EP-A- No. 0063084, to make a connector.

FIGS. 2a, 2b and 2c illustrate three examples of structures of single-mode optical fibers with polarization maintenance that can be used according to the invention.

In FIG. 2a, the fiber comprises a circular shaft (22) surrounding an elliptical core (23). In the example depicted in FIG. 2b, the fiber comprises a circular shaft (22) and a circular core (24) surrounded by an elliptical constraint element (25).

In the example of the application of FIG. 2c, the fiber comprises a circular shaft (22), an elliptical core (23), and two perceptibly trapezoidal section-constraint elements (26).

The ferrule illustrated in FIG. 1 is adjusted as follows:

After the end of fiber (11) in the element (9) has been glued and polished, the ferrule is placed opposite a sighting telescope equipped with a crossbar-shaped reticule. White light is shone through the orifice (8) in the obturation piece (5). For example, the image illustrated in FIG. 3 is obtained. Then, as described in EP-A- No. 0165837, adjustment is made by inserting micropiercers into the radial holes (17) of the body so as to center the optical fiber on the reticule, as illustrated in FIG. 4. The joined inner element (9) of the nucleus (12) is then immobilized by gluing the latter onto the piece (3) by injecting resin through the radial holes (17).

Finally, a relative rotating movement between the body (1) and the socket (18) is carried out until the position shown in FIG. 5 is reached, where the large axis of the elliptical fiber core (FIGS. 2a and 2c) or the large axis of the elliptical constraint piece (FIG. 2b) is aligned on the vertical axis of the crossbar of the telescope.

To finish, the socket (18) is immobilized on the body (1) by injecting resin into the radial holes (20).

Two ferrules prepared in this way can be placed into a female access coupler that has indexing pegs arranged in a row 180 degrees opposite each other, creating a connector. The angular orientation of the fiber is produced by the indexing groove (19) at which the socket (18) is provided.

Although the invention has been described in connection with a particular method of application, it is quite evident that it is in no way limited to that application, and that numerous variants and modifications can be applied to it without going beyond its framework or its spirit.

We claim:

1. A ferrule of a connector for single-mode optical fibers with polarization maintenance, comprising a tubular outer body which comprises, at its front end a wall having a conical profile, a cylindrical inner element inside which an optical fiber can be immobilized, particularly by gluing, said inner element protruding from said end of the outer body, said outer body comprising radial holes for the insertion of devices such as piercers for mechanically centering the inner element in the outer body, said ferrule characterized by the fact that it comprises a socket (18) attached in rotation about said body (I) and means (20) for immobilizing said socket, preferably by gluing, on said body, said socket being furthermore supplied with an indexing reference (19).

2. A ferrule according to claim 1, characterized by the fact that the indexing reference (19) is a groove.

3. A method of adjusting ferrule according to either of claims 1 or 2, said method comprising placing the ferrule opposite a sighting telescope equipped with a reticule, moving the inner element containing a single-mode optical fiber with polarization maintenance with piercers inserted through the radial holes of the body until the center of an elliptical core of the fiber or the center of a circular core surrounded by an elliptical constraint element is brought to coincide with the center of the reticule of the telescpe, rotating the socket or the outer body of the ferrule until the axes of the elliptical core of the fiber or the axes of the elliptical constraint element surrounding a circular core, are brought to coincide with the axes of the reticule for the telescope, and immobilizing the socket in relation to the core in the position obtained by gluing.

* * * * *

UNITED STATES PATENT AND TRADEMARK OFFICE
CERTIFICATE OF CORRECTION

PATENT NO. : 4,792,205
DATED : December 20, 1988
INVENTOR(S) : Huan B. Yin et al It is certified that error appears in the above-identified patent and that said Letters Patent is hereby corrected as shown below:

Column 4, line 46, "(I)" should read --(1)--.

Column 4, line 61, "telescpe," should read --telescope,--.

Column 4, line 65, "for" should read --of--.

Signed and Sealed this

First Day of August, 1989

Attest:

DONALD J. QUIGG

Attesting Officer

Commissioner of Patents and Trademarks